Figure 1:
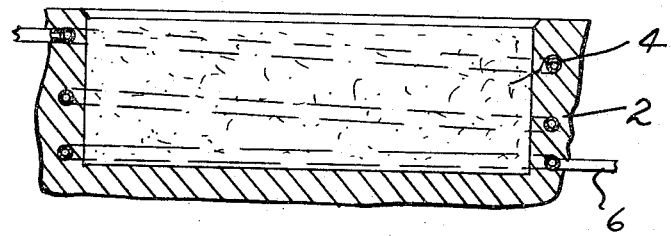

April 4, 1967   D. C. TRIMBLE   3,312,764
COLD POWDER MOLDING OF POLYTETRAFLUOROETHYLENE
Filed Oct. 22, 1964

INVENTOR.
DAVID C. TRIMBLE
BY
Cushman, Darby & Cushman
ATTORNEYS

United States Patent Office 3,312,764
Patented Apr. 4, 1967

3,312,764
COLD POWDER MOLDING OF POLY-TETRAFLUOROETHYLENE
David C. Trimble, Yorklyn, Del., assignor to Haveg Industries, Inc., Wilmington, Del., a corporation of Delaware
Filed Oct. 22, 1964, Ser. No. 405,792
6 Claims. (Cl. 264—127)

This invention relates to the molding of polytetrafluroethylene resin (TFE resin).

In preparing molded products by sintering polytetrafluorethylene existing practice recommends preforming at room temperature, or more preferably above, prior to sintering to avoid the possibility of fracture in the preform as the TFE resin goes through its first order transition point. Unfortunately such procedures do not avoid undue internal shearing and build up of residual stresses during the pressure molding of the TFE resin.

It is an object of the present invention to pressure mold TFE resin powders with reduced internal shearing during the preforming of TFE resin parts prior to sintering.

Another object is to pressure mold TFE resin powders with a lower build up of residual internal stresses during the preforming of the TFE parts prior to sintering.

A further object is to permit TFE resin particles to move relative to each other without fracture or distortion of the tight joining bonds which occur under low pressure at room and elevated temperatures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by cooling TFE resin particles to 40° F. or below, e.g. to 0° F., —109° F., —200° F. or —319° F. applying pressure to the TFE resin particles at this low temperature to form a preform and then heating the preform to 620° F. or above, e.g. 700° F. or 740° F. to sinter the same and form the final molded product. The pressure should be maintained on the preform until it has reached 70° F., and preferably should be maintained until the TFE resin passes the first order transition temperature (620° F. at atmospheric pressure). With thick sections, i.e. above ⅛ inch it is critical that the pressure not be released until the first order transition temperature is reached to avoid cracking. Such thick sections can have a thickness of ¾ inch, 2 inches, 5 inches or even more.

The cold TFE resin can be introduced into the mold along with cooling media such as finely powdered dry ice or liquified or solidified gases such as liquid or solid nitrogen, liquid or solid oxygen, liquid air, liquid or solid argon, liquid or solid neon. The liquid or solid cooling medium tends to act as a further separator of the TFE resin particles during the initial stages of forming the product and will evaporate allowing the particles to come together under the applied pressure.

Alternatively or in addition to such cooling, the mold itself can be chilled, e.g. by circulating salt water at 35° F. or other refrigerants, e.g. ethylene glycol, propylene glycol or glycerin. The refrigerant can be used for example at 0° F., 20° F. or other temperature not over 40° F.

The present invention permits greater internal adjustment of the particles in the preforming by allowing the particles to move relative to each other without fracture or distortion of tight joining bonds which would occur if the preforming were carried out at a higher temperature.

The present invention can be used to produce articles such as rods, tubes, cones, sheets, diaphragms as well as more complex shapes.

The TFE resin particles which are employed usually have a particle size of 30 to 50 mesh (Tyler screen series) although they can be 100 mesh or smaller or as large as 10 mesh.

Figure 2:
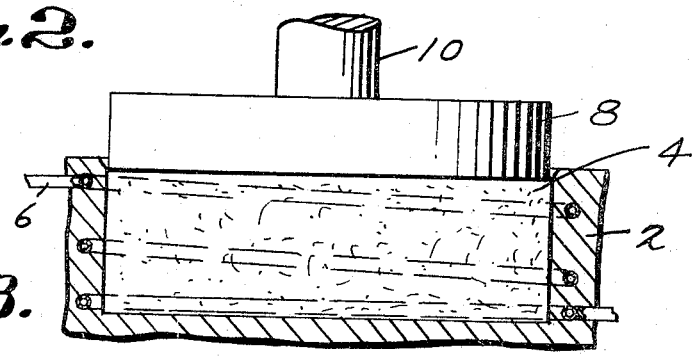
Figure 3:
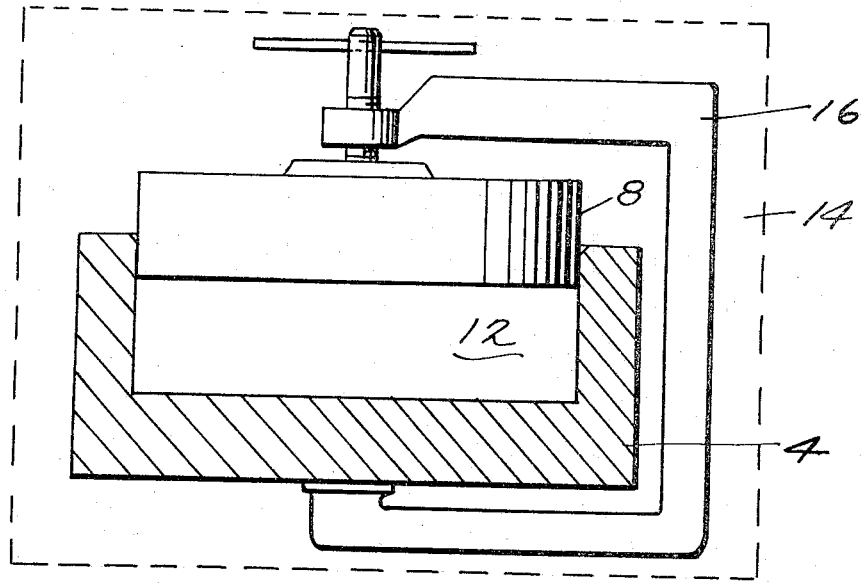

The invention will be understood best in connection with the drawings wherein:

FIGURE 1 is a fragmentary view of a preform mold;
FIGURE 2 is a view similar to FIGURE 1 showing the application of pressure; and
FIGURE 3 is a somewhat schematic view showing the placing of the preform in an oven.

Referring more specifically to FIGURE 1 there is provided a preform mold 2 containing TFE resin particles 4 having a particle size of 30–50 mesh. The temperature of the TFE resin particles is reduced to below 40° F. by passing ethylene glycol at 32° F. through pipe 6. When the TFE resin particles have been reduced to a temperature of about 32° F. a pressure of 5000 p.s.i. is applied through the aid of ram 8 attached to piston 10 to form a preform. Pressure of 5000 p.s.i. can be maintained on the TFE resin through ram 8 with the aid of any suitable means such as clamp 16 and the assembly placed in an oven 14 at 700° F. and held until the entire mass is at approximately 700° F., then quickly lowering the pressure to 1000 p.s.i. or lower, to sinter the preform of TFE resin to form a finished sheet 12 having a thickness of ¾ inch. The sheet can then be removed from the oven and the pressure released.

Alternatively, instead of cooling the mold 4 through coolant passing through pipe 6 the TFE resin can be cooled directly by intermingling with the TFE resin particles other particles of dry ice (solid carbon dioxide) or by adding liquid air to the particles in the mold. When dry ice or liquid air is admixed with the TFE resin provision should be made for venting the gases formed by volatilization of these materials during the application of the pressure.

In place of molding a sheet, cups were also successfully molded by making a preform from the cold powder, i.e. at about 32° F. and a pressure of 4000 p.s.i. followed by heating under pressure to 740° F.

Similar cup preforms, made by conventional pressure molding techniques, were characterized by sheared sections disposed circumferentially about the cup and the molded flat bottom became almost spherical.

The cold powder technique was also employed successfully in molding a nozzle liner and in molding cones. In the present process, the piece is held under pressure in the mold while warming (from 40° F. or below) in order to allow the phase transition in which a substantial volume change in the TFE resin takes place to occur without cracking the preform.

TFE resin is inert to most materials, and if a liquified or solidified gas is admixed therewith, it of course should be inert to the TFE resin.

What is claimed is:
1. A process of preparing a polytetrafluoro-ethylene preform comprising applying pressure of at least 2000 p.s.i. to polytetrafluoroethylene particles while the particles have a temperature of not over 40° F.
2. A process according to claim 1 wherein the pressure is maintained while the temperature of the preform is raised to at least 70° F.
3. A process according to claim 1 wherein the pressure is maintained while the temperature of the preform is raised to the first order transition temperature of polytetrafluoroethylene.

4. A process according to claim 1 wherein the particles are cooled with the aid of a liquified gas admixed therewith.

5. A process according to claim 1 wherein the particles are cooled with the aid of particles of a solidified gas admixed therewith.

6. A process according to claim 1 wherein the particles are cooled with the aid of an external coolant.

References Cited by the Examiner

UNITED STATES PATENTS

| | | | |
|---|---|---|---|
| 2,400,094 | 5/1946 | Benning et al. | 264—127 |
| 2,939,178 | 6/1960 | Haroldson et al. | 264—127 |

ROBERT F. WHITE, *Primary Examiner.*

J. R. HALL, *Assistant Examiner.*